United States Patent Office 2,956,472
Patented Oct. 18, 1960

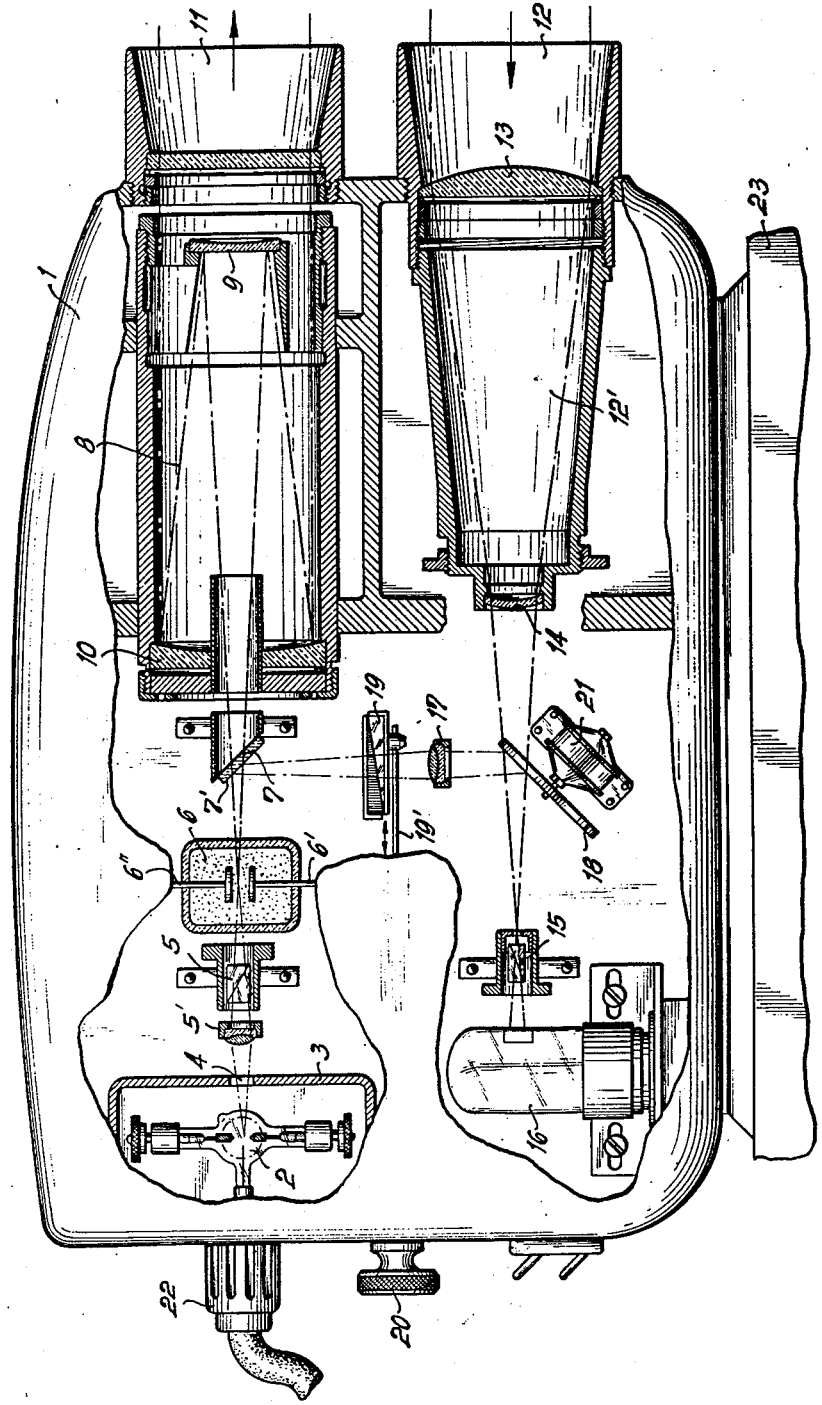

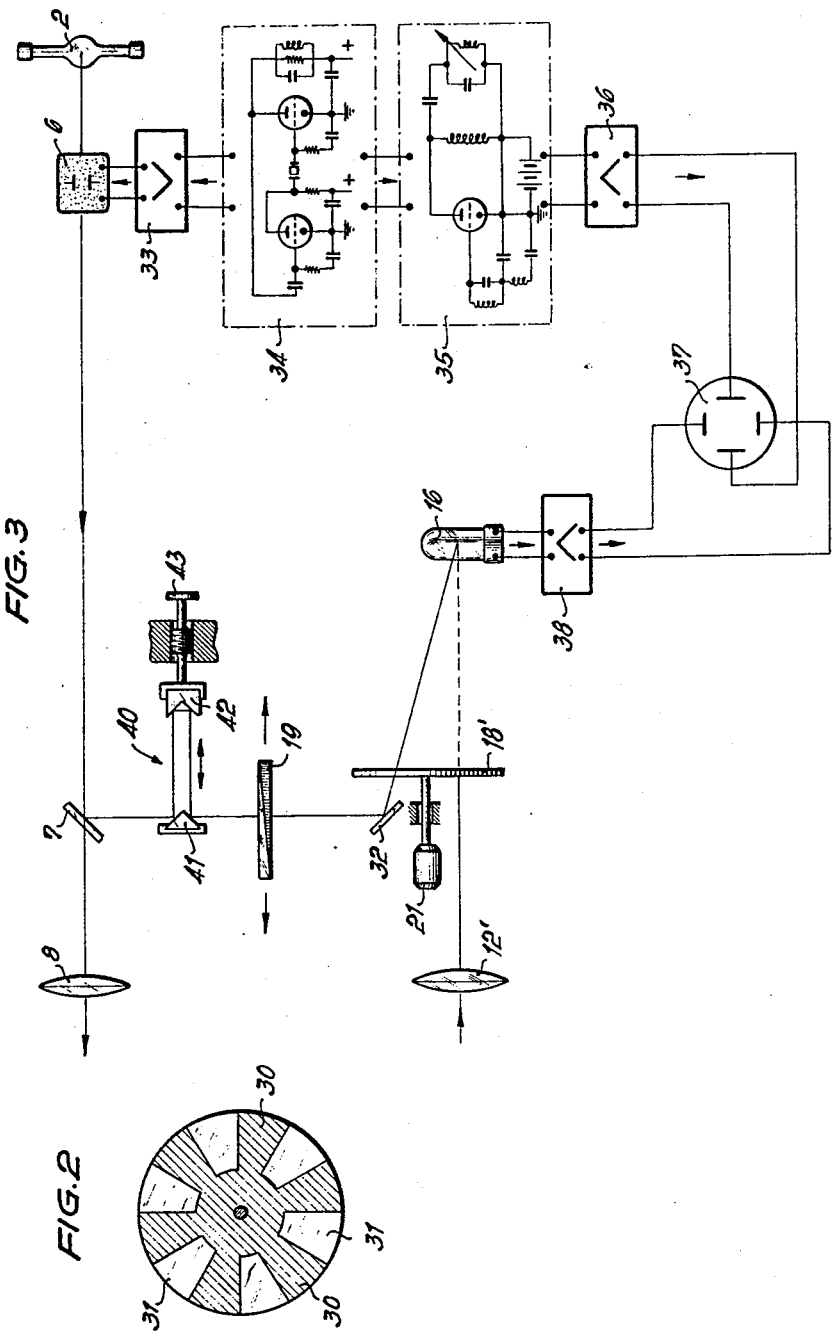

2,956,472
ELECTRO-OPTICAL DISTANCE METER

Klaus Hildebrand, Berlin-Neukoelln, Germany, assignor to Askania-Werke A.G., Berlin-Friedenau, Germany, a corporation of Germany Filed Oct. 16, 1957, Ser. No. 690,473

Claims priority, application Germany Oct. 18, 1956

7 Claims. (Cl. 88—1)

The invention to be described and claimed herein relates to a distance meter of the electro-optical type, that is, an instrument whereby a light signal or optical signal is transmitted over the distance to be measured and is then reflected, returned, received and electrically analyzed, the light being cyclically modulated as to characteristics thereof affecting the amplitude of the signal, for instance by cyclically modulated polarization of the light. The electrical analysis comprises a phase comparison, between the modulated light signal as transmitted and the modulated light signal as received, and for the success of such comparison it is of paramount importance that all disturbing phase shifts, affecting the analysis of the signals to be compared, be avoided. The invention provides a new system of the object of avoiding such disturbances.

This new system is characterized by the feature that a single signal-receiving element is used which alternately receives the aforementioned signal and a second signal comprising identically modulated light, the second signal being transmitted over a known distance. The output of the single signal receiving element is fed to a single phase comparison circuit, which accordingly, compares in alternation the transmission-reception phase shifts of the first and second signals. By means of this alternate reception of two signals in one element, desirably combined with the alternate analysis of the two signals in one circuit, it has become possible to eliminate all of the very serious disturbances which originate in the signal receiving elements and the circuit elements of the analyzing circuits and which are caused for instance by variations of operating temperature of light-sensitive cells, electron tubes, oscillators and the like. While it is known that such variations and disturbances can be avoided or compensated in other ways, the present way of doing so has been found to be particularly effective and economical.

The more particular features and advantages of the invention will best be explained in connection with the detailed description of preferred embodiments, shown in the drawing appended hereto. Figure 1 is a side elevation of such an embodiment, with parts broken away to disclose other elements which are shown in central, vertical section. Figure 2 is a front view of a detail from Figure 1. Figure 3 is a schematic diagram of an embodiment generally similar to Figure 1 but modified in some respects.

Referring first to Figure 1: the transmitting and receiving instrument 1 contains a light source 2, such as a high pressure xenon gas lamp in a housing 3 having an aperture 4. The light beam passing from the source and aperture 4 into the space provided in the instrument 1 is cyclically modulated, for instance by a polarizer-modulator. Thus the drawing shows the beam as entering a polarizing Nicol 5, after passage through a positive or converging lens or system 5'; and the polarized light passes into a Kerr cell 6. The electrodes 6', 6" of this cell are under modulated voltage, as will be described hereinafter, thereby modulating the plane of polarization of the light beam in a predetermined cycle. The modulated beam passes through a beam splitter 7, to be explained hereinafter, and then into a transmitter objective 8, shown as a Cassegrain system with interceptor 9 and main reflector 10. Desirably, as shown, the light beam is focussed into the cell 6 and collimated by objective 8. The collimated, modulated beam then leaves the instrument 1 through transmitting window 11, to traverse the unknown distance to be measured, as indicated by the arrow pointing toward the right.

It will be understood that a reflecting means, not shown herein, is provided at the end of the said distance, for instance in form of a plane mirror. The light reflected thereby returns over the unknown distance to the receiving window 12 in instrument 1, as indicated by the lower arrow. It then passes through a converging and adjustably focussing system 13, 14, forming a receiver optic 12', into an analyzer Nicol 15 and then into the principal receiver element, a cyclically photo-sensitized tube or photo-cell 16, preferably of the multiple dynode or electron multiplier type.

A second light signal, for comparison with that received from elements 11, 12, is generated by the aforementioned beam splitter 7, which may for this purpose consist of a plane-parallel plate of highly transparent glass to form a partial reflector, branching off a small percentage of the light of the beam, while the greater part of such light continues to and through window 11 as described. As the length of the unknown distance to be measured is frequently great in comparison with the path length of the second signal, and as accordingly the intensity of illumination by the primary beam, received through window 12, is frequently small in comparison with any substantial intensity of the second signal, whereas the phase comparisons of course are simplified by keeping such intensities at least approximately equal, it is preferred to further reduce the reflectance of the partial reflector plate 7 by a coating applied to the surfaces thereof. Schematically, such coating is represented by line 7', although the coating usually is thinner than the line. The beam deflected at 7 is directed to receiver tube 16 by converging system 17 and reflector system 18; and for further reduction of the intensity thereof, subject to suitable adjustment, a photometer wedge system 19 may be interposed between reflectors 7, 18. The wedge system may comprise a pair of gray or neutral density wedges, suitably held together, and a rod 19' shiftable by a knob 20 for sliding the wedges relative to one another across the second light beam and for thereby changing the total thickness of the gray wedge system.

The reflector system 18, while required to reflect the second light beam to the receiver tube, must not interfere with the aforementioned passage of the primary light beam to said tube, or, more completely expressed, must allow passage of both beams to said tube in such alternation as to provide for suitable comparison of phase shifts caused by the transmissions of the two beams. Nevertheless it is necessary or at least preferred to transmit both beams over paths having terminal portions which coincide with one another; and for this reason, again, it is preferred to interpose system 18 between receiver optic 12 and receiver Nicol 15, as shown, and to arrange it in form of a special light chopper which allows, alternately, the first and second beams to reach the tube 16 along the same terminal path 18 to 16. Such a special chopper is schematically shown in Figure 2; it forms a small, revolving wheel, having transparent sectors 30 and sectors 31 reflecting the second beam and stopping the first beam. These sectors may be formed for instance by silvering suitable portions of one surface of a circular glass plate. Accordingly the second signal is formed at 7 by partial reflection; it may be controlled at 19 and 17; and it is then directed to the receiver tube 16 by full reflection at portion 31 of chopper 18, the distance from source 2 via 7, 18 to receiver 16 being predetermined and known. The primary signal reaches the receiver when the transparent sectors 30 are in front of the tube, the second signal, when the reflecting sectors 31 are in front. This alternation is provided by a synchronous motor 21 which rotates the chopper disc 18 at a suitable speed, desirably coordinating said alternation closely with the modulation cycle so that the frequency of alternation for instance coincides with a few integral multiples of the modulation frequency. Such coordination can be achieved by various well-known motor circuit arrangements, not shown.

The disclosure given up to this point is intended only to explain the fundamental, optical arrangement of the instrument, without details such as electrical connections 22 or mechanical supporting features 23. For a schematic showing of the electrical system, reference should now be made to Figure 3. The aforementioned parts 2, 6, etc., up to and including the receiver tube 16, are here indicated in schematically simplified form, together with partial reflector 7, gray wedge system 19 and a somewhat modified chopper 18'. This modified chopper may have odd numbers of transparent and opaque sectors, instead of the even numbers of transparent and reflecting sectors provided in Figure 2; and whenever an opaque sector stops the primary beam, as shown in Figure 3, a transparent sector opposite the same transmits the second beam, with the aid of an auxiliary mirror 32. A modulation system 33, 34 for the light beams may comprise a quartz stabilized oscillator 34, controlling the Kerr cell 6 through an amplifier 33. The oscillation is desirably of sharply defined wave form such as that of a saw tooth wave generator. Through a frequency multiplier 35 and a second amplifier 36, this oscillation is also impressed on the voltage of electrostatic time sweep plates, or more generally on the condition of the time sweep deflectors of an oscilloscope or oscillograph or the like, indicated at 37. The amplitude sweep deflectors or plates of the device 37 receive the output of the photosensitive tube 16, through amplifier 38; and said tube may be cyclically sensitized, in well-known manner, by further circuitry connected for instance direct with Kerr cell amplifier 33. It will be understood that several branches of interconnecting circuitry between devices 33 to 38 are shown only schematically, or not shown at all, such details being known to persons skilled in the electronic art. The important matter is that, due to the provision of a single receiver 16 and of a single circuit 33 to 38 for the same, the pattern appearing on the screen of the oscilloscope 37 indicates the phase relations of the primary and secondary light beams with a high degree of precision, undisturbed even by such phase-shifting influences as are unavoidable in phototubes and electronic circuit elements.

The form of the pattern depends on factors including the multiplication ratio of frequency multiplier 35, which ratio can be selected in various suitable ways; it may provide for instance a time sweep frequency of two times the light modulation frequency. The phase of each light signal, that of the primary signal and that of the second signal, will then be represented as a luminous curve intersecting the curve which represents the other signal; and the location of the intersection point will indicate the relation of the phase shift suffered by the first light signal to the phase shift which the second or comparison signal has undergone. This in turn, as will readily be understood by those skilled in the art of electro-optical distance meters, allows ready computation of certain measurements required for the measuring of the unknown distance traversed twice by the primary beam, whether such computation be performed mechanically or by the operator.

It is also known that, for the complete measurement of the unknown distance, it is usually necessary to use different frequencies of light modulation, in sequence, or to use some equivalent of such frequency change. Inasmuch as the precise performances of modulation elements such as a Kerr cell 6 are more predictable with fixed and stable oscillators 34 than with variable ones, particularly more than with infinitely variable ones, it is preferred to change the known path length of the secondary or comparison beam. This may be achieved by an adjustable light path element such as the loop device 40, shown as interposed between partial reflector 7 and gray wedge system 19. The loop device is schematically shown as comprising a stationary reflector prism 41, facing a movable reflector 42 of hollow cone shape, the latter being axially shiftable, toward and away from 41, by a mechanism 43 which may desirably include coarse and fine shifting means.

In operation, oscillator system 34, 35, 36 creates a first pattern on the screen of oscilloscope 37, in response to the phase shift in the modulation of the light traversing the unknown distance from source 2 to the remote reflector and back to photosensitive area 16. The same oscillator system also creates a second pattern on the same screen, in response to the phase shift, if any, in the identical modulation of the light traversing the known distance from the source to beam splitter 7, controls 40, 19 and the aforesaid sensitive area 16. The displacement, if any, of the first pattern relative to the second measures one component of the unknown distance. A modified component can be measured after predetermined change of light loop length 40, and the two measurements, or more generally a number of such measurements, provide the required indication of the unknown distance. The measurement is more direct than the age-old triangulating, particularly since the complete freedom from thermal shifts and the like, achieved by the light circuit as shown and described, has eliminated any need for repeated calibrations and the like.

Heretofore, the tubes and other circuit elements of the electronic measuring system for an electro-optical device of the present kind had occasioned much operating difficulty and expense, as elements of this kind impose very outspoken, complex and disturbing shifts upon the phase measurements, thereby tending to cause spurious measurements, because of a number of operating factors notably including the unavoidable changing of operating temperatures. Theoretically it was and is possible to minimize such disturbance by measures including high-precision thermal compensation means; and such means may still be used in some instances, particularly to stabilize the performance of the Kerr cell or equivalent modulator 6. Such means and measures, however, are expensive, bulky and impractical and it has therefore been attempted in various ways to replace them by simpler and cheaper expedients. For instance, some improvement was provided by utilizing a single oscillator system, similar to system 33, 34, for the purpose of light modulation and for operating, symmetrically, an electron tube receiving the primary signal and a second electron tube receiving a comparison signal similar to that branched off at 7. However, disturbing phase shifts were still occasioned by circuit elements of amplifiers of such electron tubes, unless very special circuitry was used, which in turn complicated the achievement of other desirable objects, such as the possibility of using broadband high-frequency amplifiers. In addition it was necessary to synchronize such voltage changes as occurred in the power supplies of the photosensitive devices; to control the electron velocity of such devices against change by thermal influence; and still to perform complicated calibrations at frequent intervals. All these difficulties are avoided by the present system, which provides a single electronic system. Each electronic unit 16, 38, etc. and in fact each part thereof may and generally will undergo frequent, erratic changes of operating characteristics, tending to shift the phase measurements unpredictably, but so long as primary and secondary or comparison measurements are identically shifted, no actual disturbance is caused.

The apparatus and operation described may be modified in many ways. For instance light chopper 18 or 18' may be constructed differently and may also be located differently; for instance it may replace beam splitter 7 in a system such as that which otherwise is shown in Figure 3. However, the illustrated systems are preferred, since they add to the intensity of the light, remotely reflected and observed adjacent instrument 1 for the aiming and orienting of objectives 8, 12'. The Kerr cell 6 may be replaced by various means but the high operating frequency of the Kerr cell, which in turn allows a correspondingly high frequency alternation of primary and secondary beam analysis, completely minimizing disturbing phase shifts, is preferred. Various elements other than those mentioned may be installed at points other than those shown; for instance the two Nicols 5, 15 may be installed directly before and behind the light modulator 6, but the mounting as shown is preferred since it allows a further increase in precision by elimination of stray polarisation-disturbing light, as is known from copending application Serial No. 623,571 filed on November 21, 1956 by the present inventor. Still other modifications may be applied to the electronic circuit 33 to 38 and to many of the elements thereof; these and others will be evident to persons skilled in the art, in view of this disclosure.

I claim:
1. In an electro-optical distance meter: a light transmitting unit comprising a light source for generating a light beam, an optical light transmitter for transmitting light of the beam to a remote reflector disposed at the end of the distance to be measured, and a light modulator between the source and the transmitter for cyclically amplitude modulating the light to be transmitted; a light receiving unit comprising a single photocell and an optical light receiver for receiving modulated and transmitted light from the remote reflector and for directing it to the photocell; an auxiliary light circuit comprising a beam splitter, interposed between the modulator and the transmitter, for permanently passing most of the modulated light to the transmitter, reflector, and receiver, while passing little of it along a relatively short path of known length to said single photocell, and an alternator interposed between said receiver and photocell and on said short path for alternately exposing said photocell to the modulated light coming from the remote reflector and to that coming over the short path; and an electrical circuit connected to said single photocell for comparing the resulting, successive output voltages of said photocell as to their relative phase positions.

2. Apparatus as described in claim 1 wherein a terminal portion of said short path coincides with a terminal portion of said light receiving unit and wherein the alternator comprises a rotatable shutter wheel having the peripheral area thereof divided into alternate, fully light reflective sectors, for passing light from the beam splitter to the photocell, and substantially fully light transmissive sectors, for passing light from the receiver to the photocell.

3. A device as described in claim 1 wherein said optical beam splitter is a plane-parallel plate of highly transparent glass.

4. A device as described in claim 3 wherein said plate has a coating thereon for minimizing reflectance thereof.

5. A device as described in claim 1 additionally including means for reducing the intensity of the light directed over said short path to keep such intensity at least approximately equal to that of said beam as received by said receiving system.

6. A device as described in claim 5 wherein the intensity reducing means comprises a system of grey wedges shiftable relative to one another for adjustment of the reduction of light flux intensity.

7. A device as described in claim 1 wherein the modulator means comprises a Kerr cell interposed between the light source and the transmitting system, a first Nicol being interposed between the light source and the Kerr cell and a second Nicol, crossed with the first, between the receiving system and the photocell.

References Cited in the file of this patent

UNITED STATES PATENTS

| | | |
|---|---|---|
| 2,490,899 | Cohen | Dec. 13, 1949 |
| 2,678,581 | Reisner | May 18, 1954 |
| 2,707,749 | Mueller | May 3, 1955 |

OTHER REFERENCES

Anderson: "Final Measurement of the Velocity of Light," Journal of the Optical Society of America, vol. 31, No. 3, March 1941, pages 187–197.

Hansen: "Surveying with Pulsed-Light Radar," Electronics, July 1948, pages 76–79.

Bergstrand: "Velocity of Light and Measurement of Distances," Proceedings of the London Conference on Optical Instruments, 1950, pages 187–200.

Compton: "Surveying with the Velocity of Light," Surveying and Mapping, July–Sept. 1954, vol. 14, No. 3, pages 283–292.